March 25, 1947.   J. L. DOUGLASS   2,417,865
MARKING DEVICE
Filed July 28, 1943
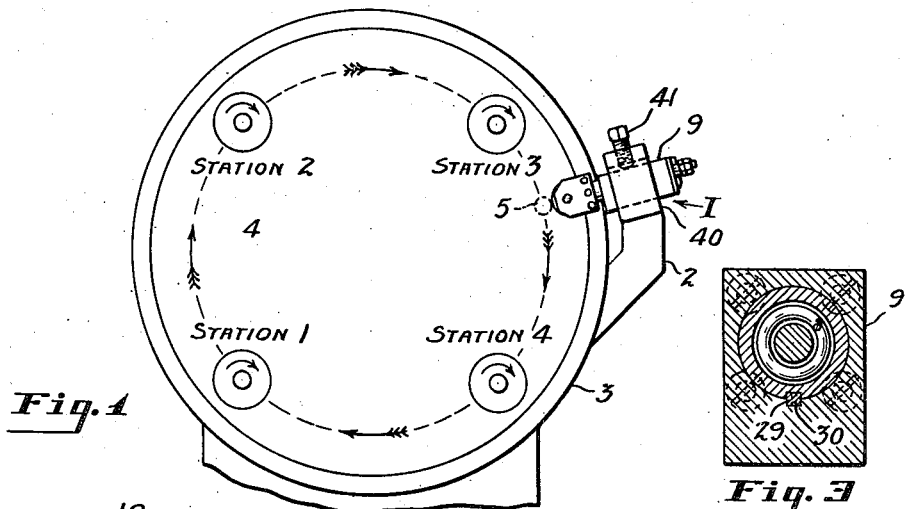
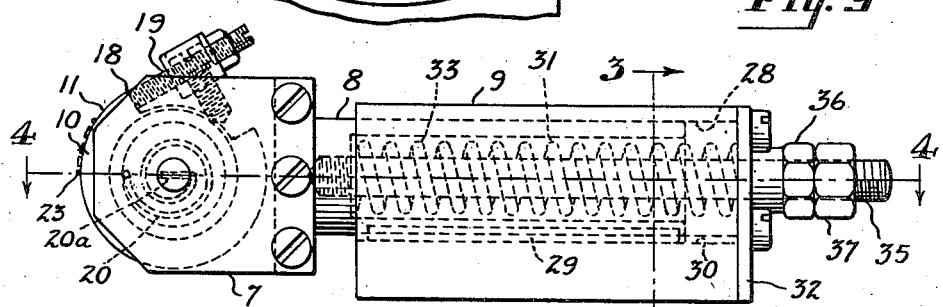
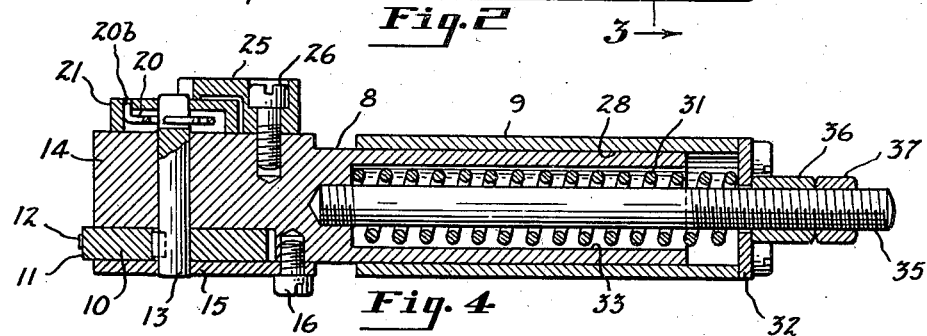
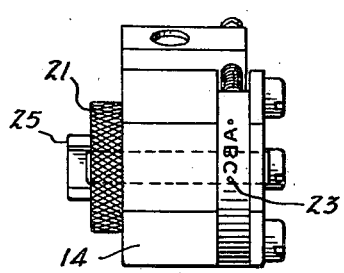
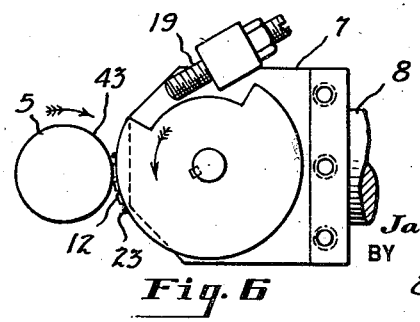
INVENTOR
James L. Douglass
BY
Evans & McCoy
ATTORNEYS Patented Mar. 25, 1947

2,417,865

UNITED STATES PATENT OFFICE 2,417,865

MARKING DEVICE

James L. Douglass, Cleveland Heights, Ohio

Application July 28, 1943, Serial No. 496,457

2 Claims. (Cl. 101—7)

This invention relates to an indexing and marking device suitable for stamping metal articles produced by multi-station machines. It particularly relates to the combination of a stamping device with a multi-station automatic screw machine and to a method of marking automatic screw machine products.

Purchasers of metal articles such as pipe couplings, connectors, bolts or other items which produced in quantity on multi-station automatic screw machines usually require a suitable legend stamped or impressed on a face of the article. Frequently it has been necessary to apply the legend by separate hand-operations after the item has been produced. Such a procedure is costly and is undesirable.

It has heretofore been proposed to apply the legend by a suitable tool arranged to roll in contact with the rotating work piece while the latter is being machined in one of the stations of a multi-station automatic screw machine. Such a method has been unsatisfactory for the reason that the legend ordinarily contacts the work piece more than once or rides upon the work piece causing wear of the work piece and of the imprinting tool so that a new imprinting element tool has to be used for each few hundred of the separate items. Also, small variations in size or diameter of the work piece have caused such variations in the imprinting pressures that the legend was not uniformly imprinted on the items manufactured.

It is the object of the present invention to provide a method of marking items producible on multi-station screw machines wherein the stamp or legend may be applied to the work piece or item being produced only once and wherein the marking device contacts the work piece or item for only a short interval.

It is another object of the present invention to provide a marking device for metallic or other items produced in multi-station screw machines which operate to impress or imbed a legend in the item with substantially the same force regardless of small variations in size or diameter of the work piece and regardless of the eccentricity of the various spindles of the machine.

It is a further object of the present invention to provide in combination with a multi-station automatic screw machine a marking, labeling or stamping device capable of automatically impressing or imbedding a legend on items manufactured in quantity in said machine, which marking or labeling is done with determinable and regulatable pressure even though the size or diameter of the item being produced varies.

It is a still further object of the present invention to provide a multi-station machine capable of producing metal articles requiring a plurality of different operations in which the articles are stamped or labeled by impressing a legend therein and in which the marker contacts the article once and with regulatable pressure.

It is another object of the present invention to provide a method of impressing a label on articles produced in an automatic multi-station screw machine or another machine capable of producing articles requiring a plurality of distinct operations in which method the legend is applied to the article only once, in which the life of the marking device is prolonged, and in which the marking does not interfere with any machining operation carried on in any of the stations of said machine.

These and other objects will be apparent from the following description of the invention as illustrated by the drawings in which:

Figure 1 is an elevational view of the head portion of a four station automatic screw machine carrying my improved marking device;

Fig. 2 is a side elevational view of a marking or labeling device embodying the present invention;

Fig. 3 is a sectional view on line 3—3 of Fig. 2;

Fig. 4 is a sectional view on the line 4—4 of Fig. 2;

Fig. 5 is an elevational view of the marking or head end of the device shown in Fig. 2; and Fig. 6 is a side elevational view with parts removed of a portion of the marking device with the imprinting element thereof in contact with a suitable work piece and showing the imprinting element roller at substantially its extreme limit of normal rotative travel, with the legend just emerging from contact with said work piece.

Referring more particularly to the drawings in which like parts are indicated by like numerals of reference throughout the several views the marking device I is carried by a suitable mounting 2, which may be integral or rigid with respect to the frame 3, of a screw machine having a suitable rotatable multi-station cylinder 4. The device I is carried in a suitable position so that the marking element or legend thereof is adapted to contact the work piece or article being produced only as the said work piece is being shifted between two successive stations. Thus in a four station machine, having stations 1, 2, 3 and 4 as shown in Fig. 1, the device I is positioned so that the marking element is carried between suitable stations such as stations 3 and 4 so that the external surface of the work piece 5 is contacted by the imprinting roller element of the device I only as the work pieces pass between stations such, for example, as stations 3 and 4. The mounting 2 comprises mechanism for mounting the device I on the machine with its work engaging head positioned between two of the stations in the path of work pieces carried by the cylinder 4.

The device I has a yieldably supported work engaging marking head 7, a body 9, means such as a suitable guide 8 which cooperates with the body portion 9 for slidably or movably carrying said head portion with respect to said body portion. The head portion 7 rotatably carries a work engaging imprinting element 10 having a work engaging imprinting surface portion 11 which is preferably of arcuate form and which contains a legend 12 which preferably protrudes therefrom or is embossed thereon. The imprinting element 10 is fixedly carried on the shaft 13 which is journaled within the base 14 and the cover plate 15 which is attached to the base 14 by suitable means such as cap screws 16. The imprinting element 10 is provided with stop means such as an adjustable stop, which may comprise the shoulder 18 and the adjusting screw 19 that is suitably carried by the base portion 14 of the head 7, for adjustably fixing the normal position of said embossed legend with respect to said base 14 so the legend 12 is normally in marking position for contacting the work piece. Means such as the spring 20 having one end portion 20—a thereof connected with the shaft 13 and the other end 20—b thereof connected to the adjusting head 21 is provided for normally maintaining the imprinting element in marking position, i. e., with the shoulder portion 18 bearing against an end of the stop screw 19 but permitting partial rotation of the imprinting element 10 and the shaft 13 when a rotating force is applied to the circular surface 11.

An indexing contact or point 23 is provided near the leading end of the legend 12 to make initial contact with the work piece during the imprinting operation. The point 23 is desirable because being of small area it is relatively easily imbedded within the work and it therefore facilitates positive rotation of the imprinting element. The adjusting head 21 which may be rotatively carried on the shaft 13 is attached to an end portion of spring 20 and, in cooperation with the clamp 25 which is attached to the base 14 through the screw 26, serves as means for adjusting the tension of the spring 20 and the pressure required to move the marking element from its normal marking position with the shoulder 18 against the adjustable stop screw 19.

The body portion 9 of the marking device I may have a cylinder 28 of suitable shape to receive the slide or support 8 which carries the head 7. The key 29 cooperates with the slot 30 and prevents the rotation of the slide 8 relative to the body 9. Resilient means such as the spring 31, having one end portion bearing against the plate 32 of the body 9 and the other end bearing against the slide 8, is provided for exerting force between the head 7 and the body 9 tending to move said head away from said body. The slide 8 preferably has a recess 33 to receive the spring 31 so that the spring 31 may be relatively long and will thus exert relatively constant pressure tending to force the head 7 outwardly even though the separation of the head 7 and the body 9 is varied slightly. Means such as the stud 35 fixedly carried by the slide 8 or the head 7 and protruding through the opening in the plate 32 and which cooperates with the nuts 36 and 37 thereon is provided for adjustably limiting the maximum separation between the head 7 or the element 10 and the body 9. Locking means such as the lock nut 37 is preferably provided for locking the adjusting means in the desired position.

The mounting 2 is provided with means for receiving the body 9 of the marking device I for permitting adjustment of the body 9 with respect to the frame 3 of the screw machine, and for fixedly holding the body 9 in adjusted position with respect to the frame. The mounting 2 may be provided with a slot 40 to slidably receive the body 9. A set screw 41 may be brought to bear against the body 9 and thus lock it in the desired position with respect to the frame 3.

The marking device I is positioned with respect to the frame 3 and the work pieces 5 so that the work engaging surface 11 of the rotative marking element 10 just contacts the work piece as it moves along its path intermediate stations such for example as stations 3 and 4 of the machine. By yieldably supporting the head 7 variations due to size or diameter of the work pieces are accounted for.

Suitable adjustment may be accomplished by moving the nuts 36 and 37 on the stud 35 so that the desired imprinting pressure is had and then with the set screw 41 in a loosened position moving the body 9 onto the cylindrical surface 11 and just contacting the outer surface 43 of the work piece 5 as it passes between stations. The adjustable stop screw 19 is adjusted so that the indexing point 23 which is preferably at the leading end of legend 12 is the first part of the imprinting element 10 to contact the work piece 5.

In the operation of the device the work piece 5, which is continually rotating, contacts the index 23 and as the work piece 5 passes beneath the imprinting roller this contact causes the imprinting roller to rotate with the work piece 5 and imbed or imprint the legend 12 on its outer surface 43. It will be seen that the marking devices embodying the present invention do not interfere with the machining operations; since they contact the work for only a brief period they have long life and do not damage the work piece. Since the marking head is yieldably mounted with relatively constant applying pressure they imprint items which vary slightly in size or which may not be entirely cylindrical.

It is to be understood that variations and modifications of the specific device herein shown and described for purposes of illustration may be made without departing from the spirit of the invention.

I claim:

1. A marking device for automatically marking screw machine products during the manufacture thereof comprising a work engaging marking head, a body, means for movably carrying said head with respect to said body, resilient means for exerting force tending to move said head away from said body, and means for adjustably limiting the maximum separation between said head and said body and for adjusting the force required to move said head relatively to said body, a work engaging imprinting element rotatively carried by said head, said imprinting element having an arcuate surface portion with a legend embossed thereon and an indexing point protruding therefrom and preceding said legend for making initial contact with said work piece, and by being relatively easily embedded therein causing positive rotation of said imprinting element with said work piece; stop means for adjustably fixing the desired normal marking position of said legend, resilient means for normally maintaining said imprinting element in marking position by permiting partial rotation of said imprinting element and exerting force tending to return said imprinting element to marking position when it has been moved therefrom and means for adjusting the force exerted by said last mentioned resilient means on said imprinting element.

2. A marking device for automatically marking screw machine products during the manufacture thereof comprising a work engaging marking head, a body, means for movably carrying said head with respect to said body, resilient means for exerting force tending to move said head away from said body, and means for adjustably limiting the maximum separation between said head and said body and for adjusting the force required to move said head relatively to said body, a work engaging imprinting element rotatively carried by said head, said imprinting element having an arcuate surface portion with a legend embossed thereon; stop means for adjustably fixing the desired normal marking position of said legend, resilient means for normally maintaining said imprinting element in marking position by permitting partial rotation of said imprinting element and exerting force tending to return said imprinting element to marking position when it has been moved therefrom and means for adjusting the force exerted by said last mentioned resilient means on said imprinting element.

JAMES L. DOUGLASS.

REFERENCES CITED

The following references are of record in the file of this patent:

UNITED STATES PATENTS

| Number | Name | Date |
| --- | --- | --- |
| 1,930,589 | Drissner | Oct. 17, 1933 |
| 2,299,591 | Medholdt | July 28, 1942 |
| 1,719,238 | Sander | July 2, 1929 |
| Re. 19,578 | Prussing | May 21, 1935 |
| 1,791,303 | Ferguson | Feb. 3, 1931 |
| 1,978,330 | Scholtes | Oct. 23, 1934 |
| 2,330,274 | Fiske | Sept. 28, 1943 |
| 1,850,422 | Stoll | Mar. 22, 1932 |
| 1,540,081 | Manischewitz | June 2, 1925 |
| 1,536,207 | Gordon | May 5, 1925 |
| 2,188,912 | Martina | Feb. 6, 1940 |
| 744,554 | Ingram | Nov. 17, 1903 |
| 2,344,930 | Ferguson | Mar. 21, 1944 |
| 689,189 | Hornung | Dec. 17, 1901 |
| 296,224 | Schulze-Berge | Apr. 1, 1884 |
| 2,351,519 | Jonsson | Jan. 13, 1944 |
| 2,048,138 | Paull et al. | July 21, 1936 |
| 2,052,191 | Paull | Aug. 25, 1936 |
| 2,114,272 | Temple | Apr. 12, 1938 |